C. W. BOYSE.
GAS LAMP.
APPLICATION FILED NOV. 26, 1907.
898,627.
Patented Sept. 15, 1908.
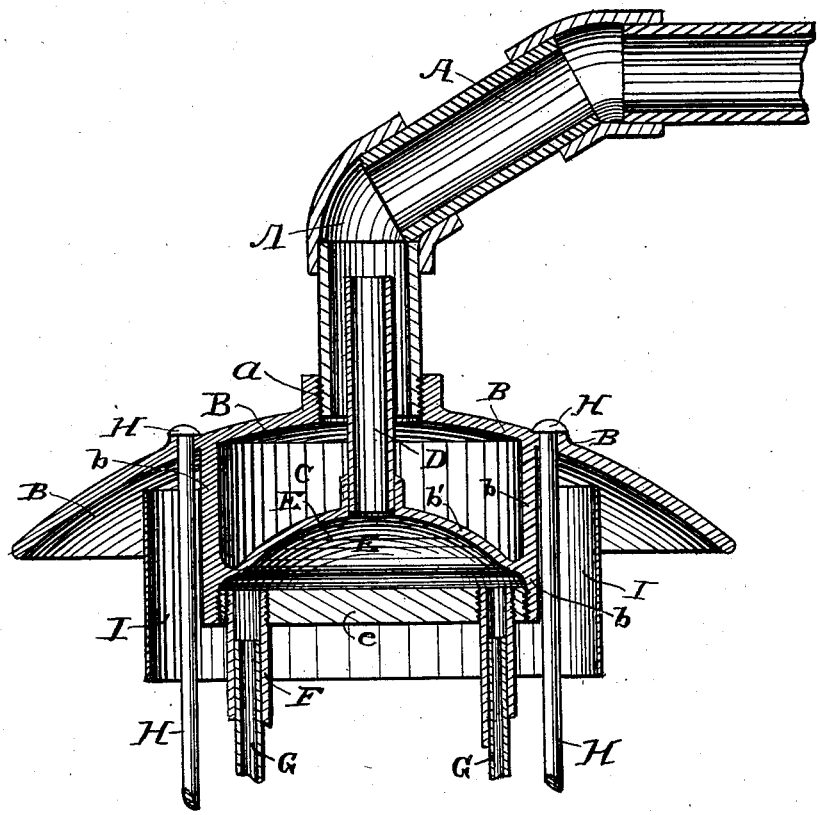
Witnesses:
Orra C. Adams.
Edward J. Brown
Inventor:
Clement W. Boyse,
By Charles Turner Brown,
Atty.

UNITED STATES PATENT OFFICE.

CLEMENT W. BOYSE, OF CHICAGO, ILLINOIS, ASSIGNOR OF ONE-HALF TO DWIGHT B. CARMICHAEL, OF CHICAGO, ILLINOIS.

GAS-LAMP.

No. 898,627.   Specification of Letters Patent.   Patented Sept. 15, 1908.

Application filed November 26, 1907. Serial No. 403,914.

*To all whom it may concern:*

Be it known that I, CLEMENT W. BOYSE, a citizen of the United States, and a resident of Chicago, in the county of Cook and State of Illinois, have invented certain new and useful Improvements in Gas-Lamps, of which the following, when taken in connection with the drawing accompanying and forming a part hereof, is a full and complete specification, sufficient to enable those skilled in the art to which it pertains to understand, make, and use the same.

This invention relates to gas lamps known in the art as gas arc lamps, and the object of this improvement is to obtain a gas arc lamp for outside use particularly during the winter months which will not smoke or otherwise injure the mantle, or become clogged or otherwise affected by water of condensation from the gas supplied thereto.

This invention constitutes an improvement upon the means of introducing gas to lamps of this class and as the construction of gas arc lamps is well known to those skilled in the art I have illustrated in the drawing referred to only that portion of the lamp embodying my invention to which my improvements are applied.

In the drawing a longitudinal sectional view of the gas supply pipe, the dome, the gas receiving chamber, the outlet therefrom, the auxiliary gas receiving chamber, the outlets therefrom and the wind shield or break are illustrated and an elevation of the rods by means of which the lower portion of the lamp is suspended from the dome.

A reference letter applied to designate a given part is used to indicate such part wherever the same appears.

A is the gas supply pipe to the lamp.

B is the dome of the lamp. The lower end of the gas supply pipe A is secured to the dome B as by screw threads a.

C is a gas receiving chamber into which gas is discharged from pipe A.

D is the outlet from chamber C.

E is an auxiliary gas chamber and F, F, are outlets from such chamber E.

G, G, are gas supply pipes fitting into the pipes forming outlets F, F. The pipe G discharges into the burner of the lamp.

H, H, are rods extending from the dome B downward by which rods the remainder of the lamp may be suspended from the dome B.

I is a wind shield.

I prefer to obtain the gas chamber C by means of forming the cylindrical wall b thereof integral with the dome B and the bottom wall b' integral with the cylindrical wall b and I prefer to obtain the chamber E by extending the cylindrical wall b of chamber C below the bottom wall b' of such chamber C so that the bottom b' of chamber C is common to such chambers C and E, forming the top of the chamber E and so that the disk e may be forced or screwed in position engaging the extension of cylindrical wall b, to form the bottom of the chamber E. When thus constructed the outlet D of chamber C consists of a pipe which is secured in the wall b', as illustrated, and such pipe forms the inlet to the chamber E. By this construction the dome B and cylindrical wall b and the common wall b' may be of cast metal as aluminium or malleable iron and the disk e may be made of brass or other suitable heat resisting metal, such disk e being directly over the flame of the lamp and subjected to great heat.

As is well known to those skilled in the art when an outside gas lamp is used at times or seasons of the year when the climatic temperature is considerably below the temperature maintained within doors, the gas delivered to the lamp is reduced in temperature while in the gas supply pipe A and thereby water of condensation is produced from such gas; and when such water of condensation flows into the small passage ways of the burners of the lamp the carefully adjusted gas discharge passage ways of the lamp are interfered with; and this improvement is designed to prevent the delivery of water of condensation from the gas to the burners of the lamps.

The operation of the device embodying this invention is as follows;—Water of condensation in gas supply pipe A and gas are delivered into chamber C, and gas is delivered into the outlet D of such chamber C from gas supply pipe A. The water in chamber C is warmed and again converted into gaseous vapor which flows from the chamber C into the pipe A and outlet D and from thence with the gas delivered into such outlet D from supply pipe A flows into auxiliary gas chamber E where such gas and vapor become further heated, being directly over the burners of the lamp, and while in this heated condition they are delivered from chamber E through pipes F and G to the burners of the lamp and consumed. Considerable heat is developed in the use of the lamp conveyed to the bottom $e$ of the chamber E and, by conduction, such heat is diffused throughout the walls $b$, $b'$, and the dome B. The temperature of the gaseous contents of chamber C is thereby raised and the temperature of such contents of the chamber C is sufficient to vaporize any water of condensation therein; so that no considerable quantity, if any, water of condensation will be at any time contained in such chamber when the lamp is in use. Chamber C is sufficiently large to contain all the water of condensation liable to be deposited therein when the lamp is not in use.

The construction herein illustrated and described is such that no water of condensation will flow onto or come in contact with the disk $e$; and the bottom $b'$ of chamber C being protected by interposed disk $e$ and chamber D from the direct heat of the lamp no injury is liable to result from the flow of water of condensation into chamber C and onto such bottom $b'$ thereof.

Having thus described my invention what I claim is new and desire to secure by Letters Patent is;—

1. In a gas lamp, the combination of a casing arranged to form a dome, and provided with a gas and water receiving chamber, a pipe attached to the dome and arranged to discharge into the chamber, such casing provided with an additional chamber, a pipe arranged to communicate with the first named chamber above the bottom thereof and to communicate with and discharge into the additional chamber, and an additional pipe arranged to form an outlet to such additional chamber; substantially as described.

2. In a gas lamp, the combination of a casing arranged to form a dome and provided with a gas and water receiving chamber, a pipe attached to the dome and arranged to discharge into the chamber, such casing provided with an additional chamber, a pipe arranged to communicate with the first named chamber above the bottom thereof and to communicate with and discharge into the additional chamber, and an additional pipe arranged to form an outlet to such additional chamber, such additional pipe arranged to communicate with the additional chamber to one side of the discharge end of the communicating pipe; substantially as described.

3. In a gas lamp, a casing arranged to form a dome and provided with a plurality of chambers, arranged one above the other and the bottom of the lower one of the chambers removable, such casing provided with a passage way communicating with the upper chamber to form an inlet, and provided with a passage way communicating with the lower chamber to form an outlet, and such casing provided with a passage way communicating with the lower chamber to form an inlet thereto and with the upper chamber above the bottom thereof to form an outlet therefrom; substantially as described.

4. In a gas lamp, a casing arranged to form a dome and provided with a plurality of chambers therein, such casing provided with an inlet to one of such chambers and with an outlet from the other of such chambers, and provided with a passage way communicating with the chamber having an inlet above the floor of said chamber, and with the chamber having an outlet and such chambers arranged so that the one provided with an outlet is underneath the other one; substantially as described.

5. In a gas lamp the combination of a casing provided with a gas and water receiving chamber, a pipe arranged to support the casing and to form an inlet to deliver fluid into such chamber, an additional chamber, an outlet from such gas and water receiving chamber arranged to communicate therewith above the bottom thereof and to discharge into the additional chamber, a gas burner and an outlet from such additional chamber arranged to communicate with the burner, such burner arranged relative to the casing so that heat generated by the burner is directed onto the side walls of the chambers in said casing and onto the bottom of the additional chamber; substantially as described.

CLEMENT W. BOYSE.

In the presence of—
CORA A. ADAMS,
EDWARD J. BROWN.